(12) United States Patent
Tan et al.

(10) Patent No.: US 11,537,160 B2
(45) Date of Patent: Dec. 27, 2022

(54) LATCHES WITH RECEIVERS TO RELEASABLY ENGAGE ANCHOR POINTS

(71) Applicant: Hewlett Packard Enterprise Development LP, Houston, TX (US)

(72) Inventors: Chong Sin Tan, Spring, TX (US); Joseph Allen, Tomball, TX (US); David W. Sherrod, Tomball, TX (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 1065 days.

(21) Appl. No.: 15/271,492

(22) Filed: Sep. 21, 2016

(65) Prior Publication Data

US 2018/0080260 A1 Mar. 22, 2018

(51) Int. Cl.
*G06F 1/16* (2006.01)
*E05C 3/06* (2006.01)
*E05B 65/00* (2006.01)
*G06F 1/18* (2006.01)
*E05B 63/18* (2006.01)

(52) U.S. Cl.
CPC .............. *G06F 1/16* (2013.01); *E05B 65/006* (2013.01); *E05C 3/06* (2013.01); *G06F 1/1656* (2013.01); *G06F 1/1679* (2013.01); *G06F 1/181* (2013.01); *E05B 63/185* (2013.01)

(58) Field of Classification Search
CPC .. E05B 65/006; E05B 65/0067; E05B 63/185; E05B 63/20; E05B 15/006; E05B 15/0053; E05C 3/06; E05C 3/08; Y10S 292/12; Y10S 292/30; Y10T 292/1047; Y10T 292/1079; Y10T 292/108; Y10T 292/307; Y10T 292/308; Y10T 292/57; G06F 1/1679; H05K 7/1409

USPC ............ 292/199, 279, 280, 216, 200, 336.3, 292/DIG. 12, DIG. 30
See application file for complete search history.

(56) References Cited

U.S. PATENT DOCUMENTS

| | | | | |
|---|---|---|---|---|
| 1,302,873 A | * | 5/1919 | Stiff | E05B 63/20 292/335 |
| 1,330,693 A | * | 2/1920 | Fisher | E05B 63/20 292/335 |
| 1,495,444 A | * | 5/1924 | Sachs | E05B 65/006 292/99 |
| 2,751,639 A | * | 6/1956 | Oswald | E06B 3/28 49/366 |

(Continued)

FOREIGN PATENT DOCUMENTS

| | | | | |
|---|---|---|---|---|
| CH | 238300 A | * | 7/1945 | E05B 63/20 |
| DE | 4425519 C1 | * | 11/1995 | B65F 1/1615 |

OTHER PUBLICATIONS

Machine Translation of CH 238300, 2019, pp. 1-4 (Year: 2019).*

*Primary Examiner* — Christine M Mills
*Assistant Examiner* — Yahya Sidky
(74) *Attorney, Agent, or Firm* — Hewlett Packard Enterprise Patent Department (57) ABSTRACT

Examples described herein relate to a latch for releasably coupling objects. In some such examples, the latch includes a receiver, a torque member, and a handle. The receiver includes a lobe to releasably engage an anchor point within a recess of the receiver. The torque member is rotatably coupled to the receiver to rotate the receiver. The handle includes a torque portion rotatably coupled to the torque member to rotate the torque member and includes a lever extending from the torque portion.

15 Claims, 4 Drawing Sheets

(56) References Cited

U.S. PATENT DOCUMENTS

| | | | | |
|---|---|---|---|---|
| 5,721,669 | A * | 2/1998 | Becker | G11B 33/124 |
| | | | | 361/679.31 |
| 6,412,849 | B1 | 7/2002 | Fast | |
| 6,685,489 | B1 * | 2/2004 | Rubenstein | H05K 7/1409 |
| | | | | 439/157 |
| 7,027,309 | B2 * | 4/2006 | Franz | H01R 13/62933 |
| | | | | 361/732 |
| 7,165,984 | B1 * | 1/2007 | Behrens | H05K 7/1409 |
| | | | | 439/157 |
| 7,297,008 | B2 * | 11/2007 | Griffin | H05K 7/1409 |
| | | | | 439/157 |
| 7,325,874 | B2 | 2/2008 | Zhang | |
| 7,782,606 | B2 | 8/2010 | Baker | |
| 10,093,362 | B2 * | 10/2018 | Estrada | E05C 3/12 |
| 10,524,378 | B2 * | 12/2019 | Kapoor | H05K 7/1489 |
| 2005/0111178 | A1 * | 5/2005 | Bradley | H05K 7/1411 |
| | | | | 361/679.38 |
| 2009/0115204 | A1 | 5/2009 | Rycroft | |
| 2014/0284946 | A1 | 9/2014 | Bennett et al. | |
| 2016/0032629 | A1 | 2/2016 | Rahilly | |

* cited by examiner

LATCHES WITH RECEIVERS TO RELEASABLY ENGAGE ANCHOR POINTS

BACKGROUND

Modular computing systems may arrange various computing resources into discrete pluggable modules. For example, a system may comprise compute modules, storage modules, management modules, network modules, power supply modules, and/or other modules in various numbers and configurations. Inserting a module into an enclosure may physically and electrically couple the computing resources on the module to the rest of the computing system.

Modularity may provide greater flexibility for customers, who can configure a system by selecting and installing a set of modules suited to a task. Because modules are simple to install, upgrading the computing system also becomes easier. Furthermore, modularity may simplify repairs because, if a module fails, it may be removed and replaced. However, because the modules separate from the enclosure, there is greater risk of a module becoming accidentally dislodged than in monolithic systems. Accordingly, a modular computing system may include various mechanisms to releasably secure modules to the enclosure.

BRIEF DESCRIPTION OF THE DRAWINGS

Certain examples are described in the following detailed description with reference to the drawings, of which.

DETAILED DESCRIPTION OF SPECIFIC EXAMPLES

Many computing systems have a modular design where removable computing modules are housed within an enclosure. For example, a system may include a mixture of computing modules, storage modules, network modules, management modules, power modules, and/or other suitable modules inserted in one or more enclosures. Inserting a module in an enclosure may physically as well as electrically couple the module, and the system may rely on solid retention of the module in the enclosure. System errors, power spikes, and other events may occur if contact is not maintained, and these may result in data corruption as well as damage to the system and the module. Accordingly, some examples of the present disclosure provide a latch to facilitate insertion of a module into an enclosure and to ensure solid retention of the module. The latch may also facilitate removal of the module. Furthermore, the latch is not limited to computing modules and is equally suitable for use in other applications to releasably secure two or more objects.

The latch may have two states or configurations, an open configuration and a latched configuration. When in the open configuration, an anchor point of an object to be secured may be inserted into the latch. When a force is applied in a first direction, the latch transitions to the latched configuration and engages the anchor point. When a force is applied in a second direction, the latch transitions back to the open configuration and the anchor point is disengaged. In some examples, the anchor point may be forcibly disengaged from the latch. The latch may be configured to provide a mechanical advantage where the force on the anchor point is greater than the input force. In some examples, the latch includes a lockout member that prevents the latch from latching until the anchor point is properly aligned or the lockout is manually released.

Examples are described with reference to the following figures. Unless noted otherwise, these figures and their accompanying description are non-limiting, and no element is characteristic of any particular example. In that regard, features from one example may be freely incorporated into other examples without departing from the spirit and scope of the disclosure.

Figure 1A:
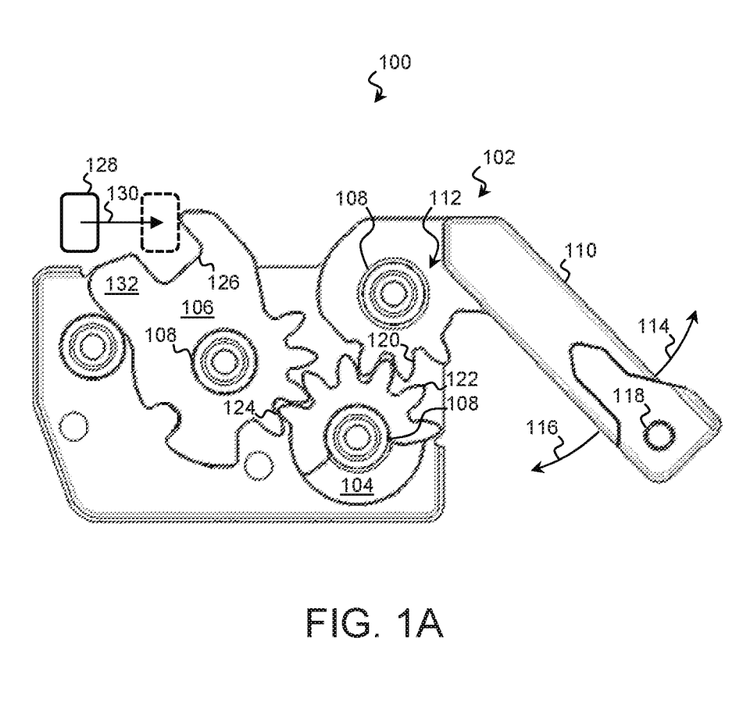
FIG. 1A is a top view of a latch in an open configuration according to some examples of the present disclosure.
Figure 1B:
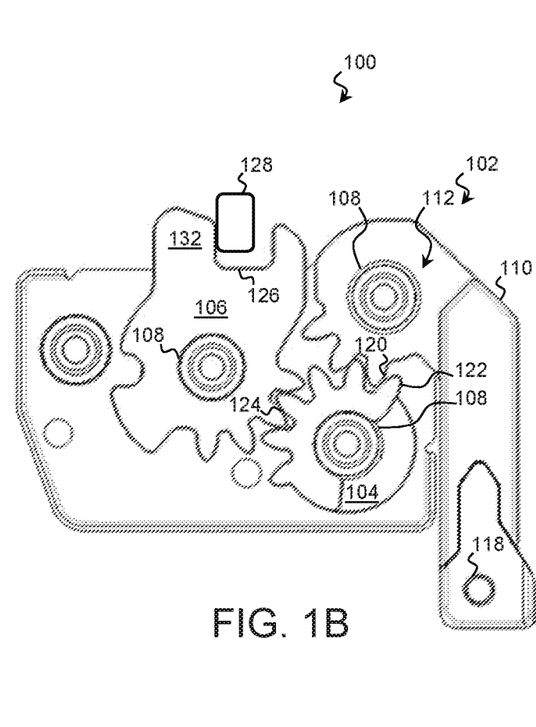
FIG. 1B is a top view of a latch in a latched configuration according to some examples of the present disclosure.

FIG. 1A is a top view of a latch 100 in an open configuration according to some examples of the present disclosure. FIG. 1B is a top view of the latch 100 in a latched configuration according to some examples of the present disclosure. The latch 100 includes three rotatable components, a handle 102, a torque member 104, and a receiver 106. Each of these components is disposed on a separate shaft 108 that allows the component to rotate. In some examples, the components are coupled to the respective shaft 108 in such a manner as to allow the component to rotate relative to its shaft 108. Additionally or in the alternative, a component may be fixedly coupled to the shaft 108, and it is the shaft 108 itself that rotates in order to rotate the coupled component.

In addition to allowing the components to rotate, the shafts 108 may be used to fixedly secure the latch 100 to an object such as a computing module. Accordingly, a shaft 108 may be hollow to allow a fastener such as a bolt, a screw, a rivet, or other fastener to pass through the shaft 108 and may include a tapered crown to retain the fastener. The fastener may fixedly secure the latch 100 to the object.

Turning to the rotatable components, the handle 102 may include a lever portion 110 and a torque portion 112. The lever portion 110 may provide a working surface for an operator to apply force to rotate the handle 102 using a human hand or other tool and may be sized accordingly. A rotational force applied to the handle in a first direction 114 may cause the latch 100 to transition to the open configuration of FIG. 1A, while a rotational force in a second direction 116 opposite the first direction 114 may cause the latch 100 to transition to the latched configuration of FIG. 1B. The lever portion 110 may include a recess 118 extending partially and/or completely through the lever portion 110 to accommodate a linkage that fixedly couples multiple handles 102 of multiple latches 100 so that they rotate in unison in response to the rotational force.

The lever portion 110 may extend from the torque portion 112 such that the rotational force applied to the lever portion 110 is translated to the torque portion 112. The torque portion 112 may include a set of gear features 120 to interface with a complimentary set of gear features 122 of the torque member 104. Additionally or in the alternative, the torque portion 112 of the handle 102 may be rotatably coupled to the torque member 104 by another mechanism (e.g., friction coupling). In these examples and others, the handle 102 is rotatably coupled to the torque member 104 such that the rotational force applied to the lever portion 110 may cause the torque member 104 to rotate.

In turn, the torque member 104 may be rotatably coupled to the receiver 106. In some examples, the receiver 106 includes a set of gear features 124 that are complimentary to the set of gear features 122 of the torque member. Additionally or in the alternative, the torque member 104 is rotatably coupled to the receiver by another mechanism (e.g., friction coupling). Thus, the torque member 104 and the receiver 106 are rotatably coupled such that rotational force applied to the lever portion 110 of the handle 102 may cause the torque member 104 to rotate the receiver 106.

The receiver 106 includes a recess 126 for engaging an anchor point 128. Whereas the latch 100 (and by extension the receiver 106, the torque member 104, and the handle 102) may be fixedly coupled to a first object (e.g., a computing module or other object), the anchor point 128 may be fixedly coupled to a second object (e.g., an enclosure or other object). Referring first to FIG. 1A, the anchor point 128 may be introduced into the recess 126 while the latch 100 is in the open configuration as indicated by arrow 130. Once the anchor point 128 is introduced, the latch 100 may be transitioned to the latched configuration as shown in FIG. 1B. In the latched configuration, a lobe 132 of the receiver 106 engages the anchor point 128 within the recess 126 and secures the first object containing the latch 100 to the second object containing the anchor point 128.

Each of the handle 102, the torque member 104, the receiver 106, and the shafts 108 may include any suitable material(s) (e.g., metal, metal alloy, plastic, etc.) and may be formed using any suitable process. In some examples, the handle 102, the torque member 104, and/or the receiver 106 are formed of machined sheet metal such as cold rolled steel, hot rolled steel, stainless steel, aluminum, alloys thereof, and/or other sheet metal stock. In some examples, the handle 102, the torque member 104, and/or the receiver 106 are formed of cast metal and/or metal alloy such as aluminum, magnesium, copper, tin, zinc, iron, steel, other metals, and/or alloys thereof.

Figure 2A:
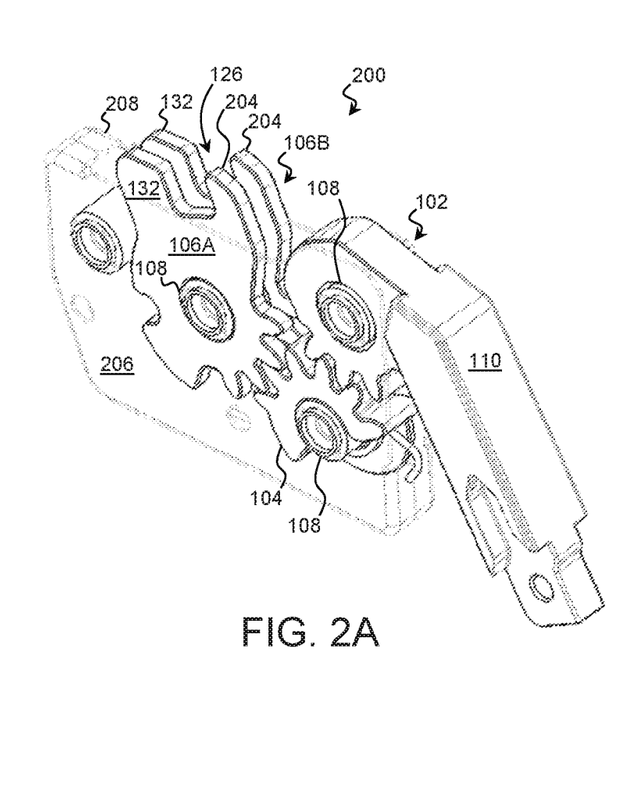
FIG. 2A is a perspective view of a latch according to some examples of the present disclosure.
Figure 2B:
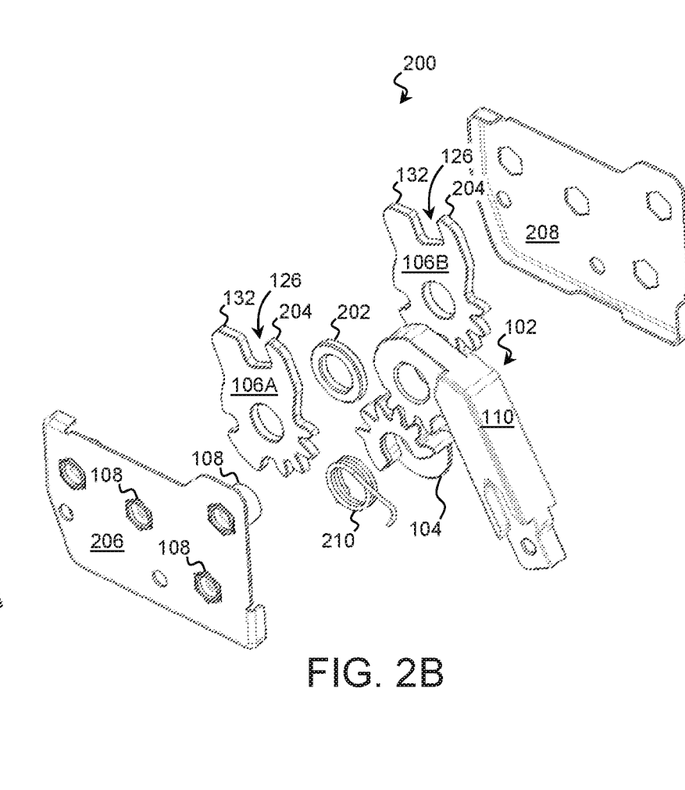
FIG. 2B is an exploded perspective view of a latch according to some examples of the present disclosure.

Further examples are described in the context of FIGS. 2A and 2B. FIG. 2A is a perspective view of a latch 200 according to some examples of the present disclosure. FIG. 2B is an exploded perspective view of the latch 200 according to some examples of the present disclosure. The latch 200 may be substantially similar to the latch 100 of FIGS. 1A and 1B in many regards. For example, the latch 200 may include a handle 102 and a torque member 104 disposed on a set of shafts 108 substantially as described above. The latch 200 may also include a plurality of receivers (e.g., receivers 106A and 106B) disposed along a common shaft 108, each substantially similar to the receiver 106 of FIGS. 1A and 1B. Receivers 106A and 106B may be separated by a spacer 202 that includes any suitable material(s) such as metal, metal alloy, and/or plastic.

The receivers 106A and 106B may each include a recess 126 for engaging an anchor point 128 (omitted for clarity). The anchor point 128 may be introduced into the recess 126 while the latch 200 is in the open configuration, and when the anchor point 128 is introduced, the latch 200 may be transitioned to the latched configuration. In the latched configuration, a lobe 132 of each receiver engages the anchor point 128 within the recess 126 to secure a first object containing the latch 200 to a second object containing the anchor point 128. To assist in ejection, the receivers 106A and 106B may each include a second lobe 204 opposite the first lobe 132 that forcibly disengages the anchor point 128 from the recess 126 when the latch is transitioned from the latched configuration back to the open configuration.

The handle 102, the torque member 104, and the receivers 106A and 106B may be sized and structured to provide a mechanical advantage when engaging and disengaging the anchor point 128. In other words, the force applied by lobe 132 and/or lobe 204 of the receivers 106A and 106B on the anchor point 128 may be greater than the force applied to the lever portion 110 of the handle 102. The ratio of the input force on the lever portion 110 and the output force on the anchor point 128 may be represented as:

$$\frac{F_{Out}}{F_{In}} = \frac{r_{In}}{r_{Out}} \times \frac{r_{TM \to H}}{r_{H \to TM}} \times \frac{r_{R \to TM}}{r_{TM \to R}}$$

where $F_{In}$ represents the input force acting on the lever portion 110, $F_{Out}$ represents the output force acting on the anchor point 128, $r_{In}$ represents the radius of the handle 102 at the point that the input force is applied, $r_{Out}$ represents the radius of the receivers 106A and 106b at the point that the output force is applied to the anchor point 128, $r_{TM \to H}$ represents the radius of the torque member 104 at the point of contact with the handle 102, $r_{H \to TM}$ represents the radius of the handle 102 at the point of contact with the torque member 104, $r_{R \to TM}$ represents the radius of the receivers 106A and 106B at the point of contact with the torque member 104, and $r_{TM \to R}$ represents the radius of the torque member 104 at the point of contact with the receivers 106A and 106B. This mechanical advantage may be used to secure and release the module and to couple and uncouple electrical connectors on the module. Many electrical connectors have a significant insertion force, and the mechanical advantage provided by the latch 200 may greatly simplify the connection process.

The receivers 106A and 106B, the torque member 104, and the handle 102 may be contained within a housing. In some examples, the housing includes two separate pieces, a front housing 206 and a back housing 208. In FIG. 2A, the front housing 206 and back housing 208 are transparent for clarity. The front housing 206 and the back housing 208 may each include openings to accommodate and secure the shafts 108 as well as openings for alignment and other purposes.

The front housing 206 and back housing 208 may include any suitable material(s) (e.g., metal, metal alloy, plastic, etc.) and may be formed using any suitable process. In some examples, the front housing 206 and/or the back housing 208 are formed of machined sheet metal such as cold rolled steel, hot rolled steel, stainless steel, aluminum, alloys thereof, and/or other sheet metal stock. In some examples, the front housing 206 and the back housing 208 are formed of cast metal and/or metal alloy such as aluminum, magnesium, copper, tin, zinc, iron, steel, other metals, and/or alloys thereof.

In some examples, the latch 200 includes a torsion spring 210 coupled to the torque member 104. The torsion spring 210 may be disposed within a recess of the torque member 104 and apply a spring force to the torque member 104 in order to bias the latch 200 towards the open configuration when not in the latched configuration and to extend the lever portion 110 when in the open configuration. Accordingly, a first spring arm of the torsion spring 210 may be coupled to apply the spring force to the torque member 104, while a second spring arm of the torsion spring 210 may be coupled to apply a countervailing spring force to the housing.

Figure 3A:
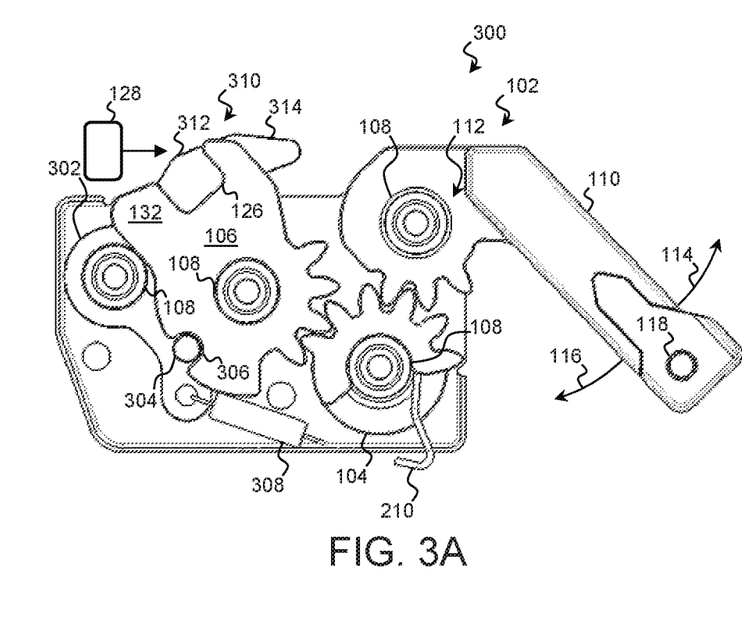
FIG. 3A is a top view of a latch with a lockout member in an open configuration according to some examples of the present disclosure.
Figure 3B:
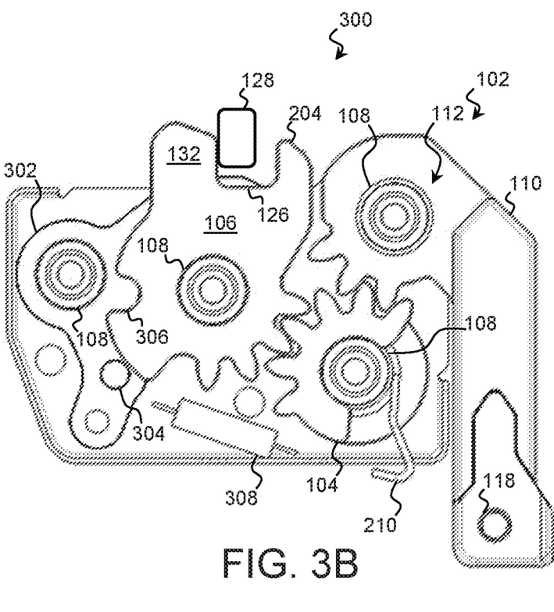
FIG. 3B is a top view of a latch with a lockout member in a latched configuration according to some examples of the present disclosure.

Turning next to FIGS. 3A and 3B, some examples include a safety mechanism to prevent the latch from closing unintentionally. FIG. 3A is a top view of a latch 300 with a lockout member in an open configuration according to some examples of the present disclosure. FIG. 3B is a top view of the latch 300 with the lockout member in a latched configuration according to some examples of the present disclosure. The latch 300 may be substantially similar to the latch 100 of FIGS. 1A and 1B and/or the latch 200 of FIGS. 2A and 2B in many regards. For example, the latch 300 may include a handle 102, a torque member 104, and a receiver 106 disposed on a set of shafts 108, each substantially as described above. The handle 102, the torque member 104, and the receiver 106 are rotatably coupled so that a rotational force applied to a lever portion 110 of the handle 102 in a first direction 114 may cause the receiver 106 to transition to the open configuration while a rotation force applied in a second direction 116 may cause the receiver 106 to transition to the latched configuration. In the latched configuration, a lobe 132 of the receiver 106 engages an anchor point 128 within the recess 126 to secure a first object containing the latch 300 to a second object containing the anchor point 128. The handle 102, the torque member 104, and the receiver 106 may be sized and structured to provide a mechanical advantage when engaging and disengaging the anchor point 128. In that regard, the force applied by lobe 132 and/or lobe 204 of the receiver 106 on the anchor point 128 may be greater than the force applied to the lever portion 110 of the handle 102.

However, it has been determined that the act of aligning the first object containing the latch 300 with the second object containing the anchor point 128 may inadvertently apply a rotational force to the lever portion 110. This may cause the latch to transition to the latched configuration prematurely, before the anchor point 128 is properly aligned with the recess 126 of the receiver 106. To remedy this, the latch 300 may include a lockout member 302 that prevents the receiver 106 from rotating and the latch 300 from transitioning to the latched configuration before the anchor point 128 is seated.

The lockout member 302 may be disposed on a shaft 108 that allows the lockout member 302 to rotate. In some examples, the lockout member 302 is coupled to the shaft 108 in such a manner as to allow the lockout member 302 to rotate relative to the shaft 108. In some examples, the lockout member 302 is fixedly coupled to the shaft 108, and it is the shaft 108 itself that rotates in order to rotate the lockout member 302.

The lockout member 302 includes a pin 304 configured to engage with a recess 306 of the receiver 106 when the latch 300 is in the open configuration. The pin 304 may prevent the handle 102, the torque member 104, and the receiver 106 from rotating and prevent the latch 300 from transitioning from the open configuration to the latched configuration in response to a force applied to the lever portion 110. Thus, an operator can grasp and torque the lever portion 110 when aligning the first object containing the latch 300 with the second object containing the anchor point 128 without accidentally closing the latch 300. The latch 300 may include a spring 308 coupled to the lockout member 302 in order to engage the pin 304 in the recess 306 of the receiver 106.

The lockout member 302 may also include a release lobe 310 configured to rotate the lockout member 302 to disengage the pin 304 from the receiver 106 when depressed. The release lobe 310 may include a first portion 312 that is laterally aligned with the recess 126 of the receiver 106 so that the introduction of the anchor point 128 into the recess 126 disengages the pin 304 from the receiver 106. This frees the receiver 106 and allows the latch 300 to transition to the latched state when rotational force is applied to the lever portion 110. In this way, the lockout member 302 permits the latch 300 to transition once the anchor point 128 is in position to be latched.

The release lobe 310 may also include a second portion 314 that is radially beyond the first portion 312 and radially beyond the receiver 106. The second portion 314 may allow an operator to manually disengage the pin 304 from the receiver 106, thereby allowing the latch 300 to transition to the latched state even without the anchor point 128. The second portion 314 may be configured to be operated by a human hand or other tool and may be sized accordingly. Accordingly, the lockout member 302 may be easily disengaged when an operator so desires.

The lockout member 302 may include any suitable material(s) (e.g., metal, metal alloy, plastic, etc.) and may be formed using any suitable process. The pin 304 and the remainder of the lockout member 302 may include the same or different materials and may be formed concurrently or separately. In some examples, the lockout member 302 is formed of machined sheet metal such as cold rolled steel, hot rolled steel, stainless steel, aluminum, alloys thereof, and/or other sheet metal stock. In some examples, the lockout member 302 is formed of cast metal and/or metal alloy such as aluminum, magnesium, copper, tin, zinc, iron, steel, other metals, and/or alloys thereof.

Figure 4A:
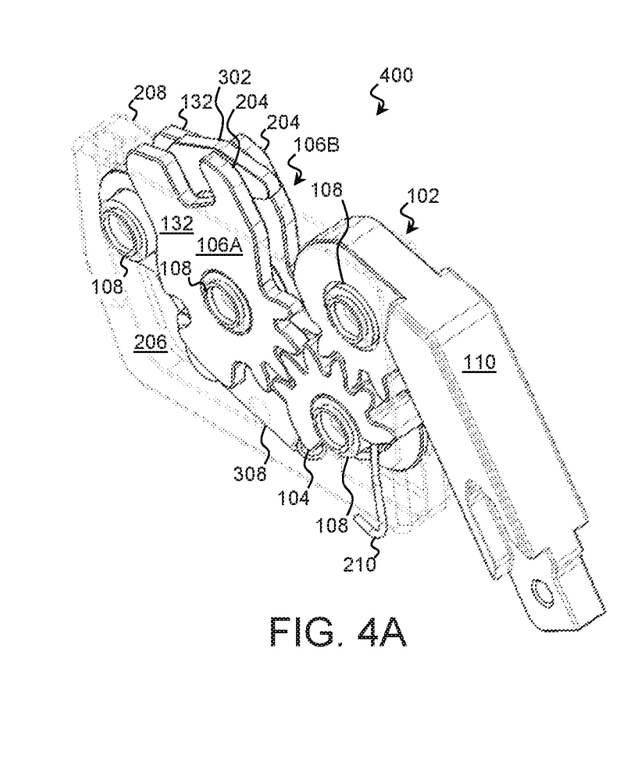
FIG. 4A is a perspective view of a latch having a lockout mechanism according to some examples of the present disclosure.
Figure 4B:
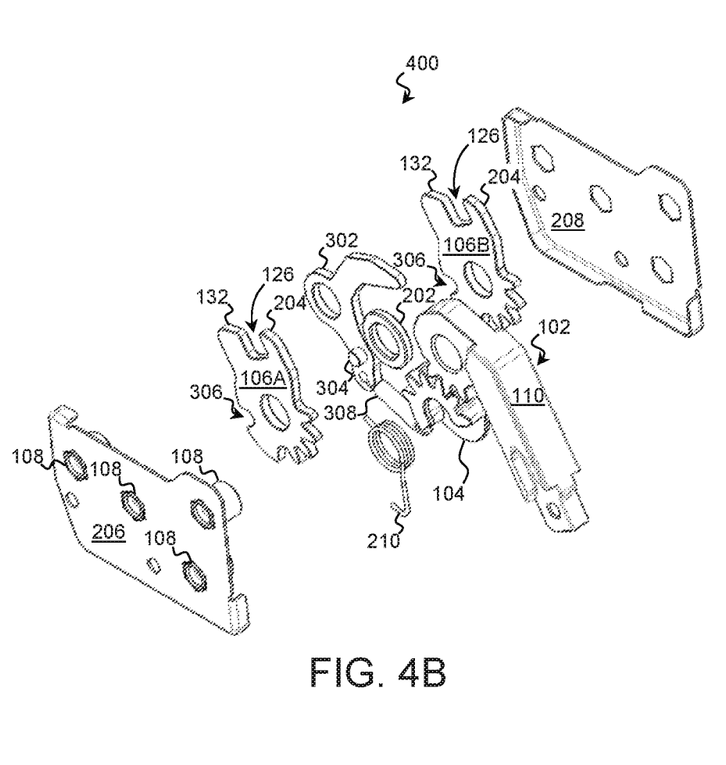
FIG. 4B is an exploded perspective view of a latch having a lockout mechanism according to some examples of the present disclosure.

Further examples are described in the context of FIGS. 4A and 4B. FIG. 4A is a perspective view of a latch 400 having a lockout mechanism according to some examples of the present disclosure. FIG. 4B is an exploded perspective view of the latch 400 having the lockout mechanism according to some examples of the present disclosure. The latch 400 may be substantially similar to the latch 300, the latch 200, and/or the latch 100 in many regards. In that regard, the latch 400 may include a handle 102, a torque member 104, and a lockout member 302 disposed on a set of shafts 108 substantially as described above.

The latch 400 may also include a plurality of receivers (e.g., receivers 106A and 106B) disposed along a common shaft 108, each substantially similar to the receiver 106 above. In that regard, each of the receivers 106A and 106B may include a recess 126 for engaging an anchor point 128 (omitted for clarity), and a lobe 132 to engage the anchor point 128 within the recess 126. To assist in ejection, the receivers 106A and 106B may each include a second lobe 204 opposite the first lobe 132 that forcibly disengages the anchor point 128 from the recess 126 when the latch 400 is transitioned from the latched configuration back to the open configuration. The handle 102, the torque member 104, and the receivers 106A and 106B may be sized and structured to provide a mechanical advantage when engaging and disengaging the anchor point 128. In that regard, the force applied by lobe 132 and/or lobe 204 of the receivers 106A and 106B on the anchor point 128 may be greater than the force applied to the lever portion 110 of the handle 102.

The receivers 106A and 106B may also include a recess 306 to engage a pin 304 of the lockout member 302 to prevent the handle 102, the torque member 104, and the receivers 106A and 106B from rotating in response to a force applied to the lever portion 110 until the lockout member 302 is disengaged. The receivers 106A and 106B may be disposed on opposite sides of the lockout member 302 and may be separated by a spacer 202.

The receivers 106A and 106B, the lockout member 302, the torque member 104, and the handle 102 may be contained within a housing that includes a front housing 206 and a back housing 208. In FIG. 4A, the front housing 206 and back housing 208 are transparent for clarity. The front housing 206 and the back housing 208 may be retained together by the set of shafts 108 that extend through the front housing 206 and the back housing, and upon which receivers 106A and 106B, the lockout member 302, the torque member 104, and the handle 102 are rotatably coupled.

A torsion spring 210 coupled to the torque member 104 and a spring 308 coupled to the lockout mechanism may each be coupled to the housing to apply a countervailing spring force to the housing.

Thus, examples of a latch for releasably engaging an anchor point are provided. In some examples, the latch is configured to engage the anchor point in response to force in a first direction and to forcibly disengage the anchor point in response to force in a second direction. In some such examples, the latch is configured to provide a mechanical advantage where the force on the anchor point is greater than the input force. In some examples, the latch includes a lockout member that prevents the latch from latching until the anchor point is properly aligned or the lockout is manually released.

In the foregoing description, numerous details are set forth to provide an understanding of the subject disclosed herein. However, implementations may be practiced without some or all of these details. Other implementations may include modifications and variations from the details discussed above. It is intended that the appended claims cover such modifications and variations.

What is claimed is:

1. A latch transitionable between an open configuration and a latched configuration, the latch comprising:
 a receiver including a first set of gear features, a first lobe, a second lobe, and a first recess defined by the first lobe and the second lobe,
  wherein the receiver interacts with an anchor point which is part of an object to be secured by being inserted into the latch and which moves between a first position and a second position,
  wherein the first lobe engages the anchor point disposed within the first recess and holds the anchor point in the first position as the latch transitions into the latched configuration,
  wherein the second lobe releases the anchor point from the first recess as the latch transitions from the latched configuration to the open configuration such that the anchor point moves and returns to the second position when the anchor point is removed from the first recess, and
  wherein the receiver includes a second recess;
 a lockout member comprising a pin and a release lobe,
  wherein the pin is positioned to engage the second recess of the receiver when the latch is in the open configuration, and
  wherein the release lobe is positioned to interface with the anchor point and allow the anchor point to push and rotate the lockout member, such that the pin is disengaged from the second recess of the receiver when the anchor point moves into the first recess as the latch transitions from the open configuration to the latched configuration;
 a torque member rotatably coupled to the receiver and comprising a second set of gear features complementary to and interacting with the first set of gear features as the torque member rotates the receiver; and
 a handle, including:
  a torque portion rotatably coupled to the torque member and comprising a third set of gear features complementary to and interacting with the second set of gear features as the torque portion rotates the torque member and the receiver, and
  a lever extending from the torque portion for rotating the torque portion.

2. The latch of claim 1, wherein an application of force on the lever in a first direction engages the anchor point within the first recess and an application of force on the lever in a second direction opposite the first direction disengages the anchor point from the first recess as the latch transitions from the latched configuration to the open configuration.

3. The latch of claim 1, wherein the receiver, the torque member, and the handle convey a mechanical advantage such that a first force applied to the anchor point by the first lobe of the receiver is greater than a second force applied to the handle.

4. The latch of claim 1, wherein the lockout member is coupled to a shaft and allowed to rotate around the shaft.

5. The latch of claim 1, wherein the release lobe includes a portion beyond the receiver and radially outward, thereby allowing the lockout member to be disengaged manually.

6. The latch of claim 1, further comprising a spring coupled to the lockout member, the spring to position the pin in the second recess of the receiver when the latch is in the open configuration.

7. The latch of claim 1, wherein:
 the receiver is a first receiver; and
 the latch further comprises:
  a second receiver defining a third recess rotatably coupled to the torque member, the second receiver including a third lobe releasably engaging the anchor point within the third recess of the second receiver,
  the first receiver and the second receiver are disposed along a common shaft, and
  the first receiver and the second receiver are disposed on opposite sides of the lockout member.

8. The latch of claim 1, further comprising a torsion spring coupled to the torque member and applying a bias force on the torque member to bias the latch towards the open configuration when not in the latched configuration.

9. A latch device transitionable between an open configuration and a latched configuration, comprising:
 a receiver disposed along a first shaft and including a first lobe and a second lobe opposite the first lobe, the first lobe and the second lobe defining a first recess, the receiver interacting with an anchor point which is part of an object to be secured by being inserted into the latch device and which moves between a first position and a second position, the first lobe releasably engaging the anchor point within the first recess of the receiver to hold the anchor point in the first position when the latch is in the latched configuration and the second lobe releasing the anchor point such that the anchor point moves and returns to the second position, thereby disengaging the anchor point from the first recess as the latch transitions from the latched configuration to the open configuration;
 wherein, in the open configuration, the first lobe and the second lobe are oriented in a same direction relative to a main body of the receiver, and wherein the receiver includes a second recess;
a torque member disposed along a second shaft and rotatably coupled to the receiver;
a handle disposed along a third shaft and rotatably coupled to the torque member; and
a lockout member disposed along a fourth shaft and having a pin to engage the receiver when the latch device is in the open configuration,
wherein the pin is positioned to engage the second recess of the receiver when the latch is in the open configuration, and
wherein the lockout member further comprises a release lobe positioned to interface with the anchor point and allow the anchor point to push and rotate the lockout member, such that the pin is disengaged from the second recess of the receiver when the anchor point moves into the first recess as the latch transitions from the open configuration to the latched configuration.

10. The latch device of claim 9, wherein the receiver, the torque member, and the handle convey a mechanical advantage such that a rotational force applied to the anchor point by the receiver is greater than a rotational force applied to the handle.

11. The latch device of claim 9, wherein the release lobe includes a portion radially outward from the receiver, thereby allowing the lockout member to be disengaged manually.

12. The latch device of claim 9, wherein:
the torque member is rotatably coupled to the receiver by a first set of complimentary gear features; and
a torque portion of the handle is rotatably coupled to the torque member by a second set of complimentary gear features.

13. A method for operating a latch transitionable between an open configuration and a latched configuration, the method comprising:
rotating a handle of the latch in a first direction to transition the latch into the open configuration and in a second direction to transition the latch into the latched configuration;
rotating a torque member of the latch by the rotation of the handle; and
rotating a receiver by the rotation of the torque member, the receiver including a first lobe, a second lobe, and a first recess defined by the first lobe and the second lobe, the rotation of the receiver including:
the first lobe engaging an anchor point that transitions between a first position and a second position, the first lobe holding the anchor point in the first position within the first recess as the latch rotates into the latched configuration, wherein the anchor point is part of an object to be secured by being inserted into the latch;
the second lobe releasing the anchor point from the first recess and into the second position as the latch transitions into the open configuration;
wherein the rotation of the receiver moves the first lobe and the second lobe such that the first lobe and the second lobe point in a same direction in the latched configuration;
wherein the receiver includes a second recess;
wherein the latch includes a lockout member comprising a pin and a release lobe, the pin positioned to engage the second recess of the receiver when the latch is in the open configuration; and
wherein the method further comprises allowing the anchor point to push and rotate the lockout member to cause the pin to be disengaged from the second recess of the receiver when the anchor point moves into the first recess.

14. The method of claim 13,
wherein transitioning the latch from the latched configuration to the open configuration comprises the pin engaging the second recess of the receiver to lock the latch out of the latched configuration; and
wherein transitioning the latch from the open configuration to the latched configuration comprises the release lobe disengaging the pin from the receiver to overcome the lock out.

15. The method of claim 13, further comprising biasing the latch towards the open configuration when the latch is not in the latched configuration.

* * * * *